Feb. 6, 1968    G. P. J. SALOMON    3,367,671
SAFETY BINDING FOR SKIS
Filed Feb. 9, 1966    5 Sheets-Sheet 1

INVENTOR
Georges P.J. Salomon
BY
Raymond A. Robb
attorney

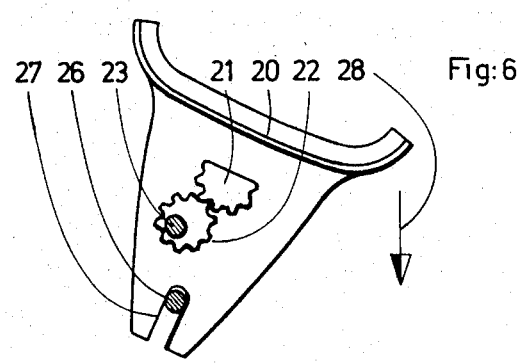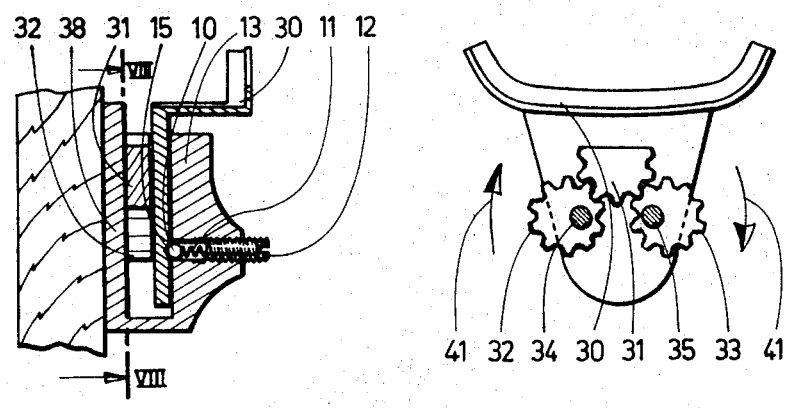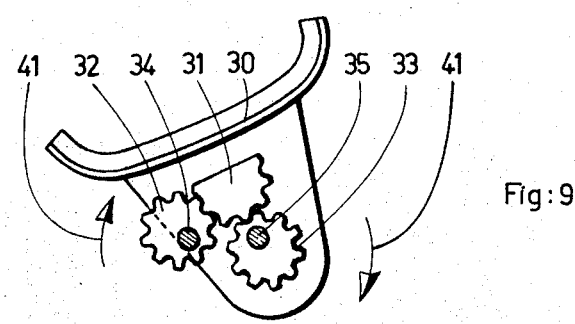

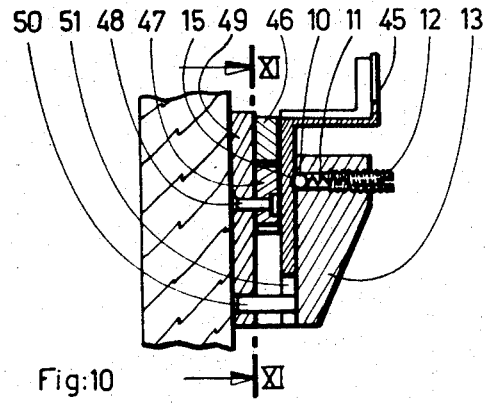
Fig:10
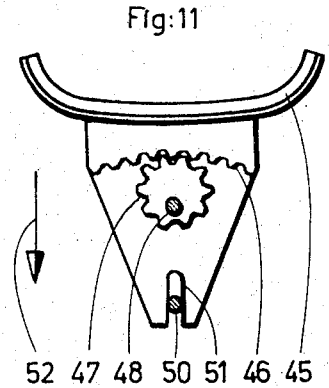
Fig:11
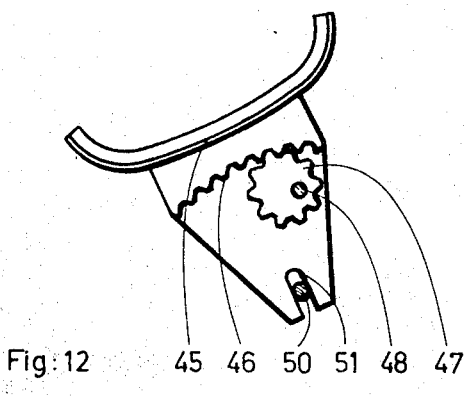
Fig:12
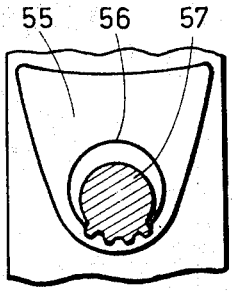
Fig:13
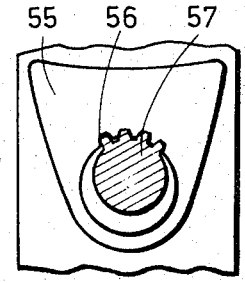
Fig:14

Feb. 6, 1968   G. P. J. SALOMON   3,367,671
SAFETY BINDING FOR SKIS
Filed Feb. 9, 1966   5 Sheets-Sheet 4
Fig: 15 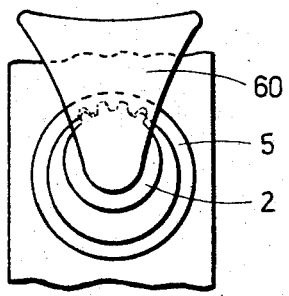
Fig: 17 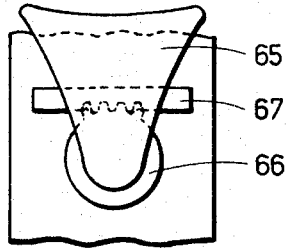
Fig: 19 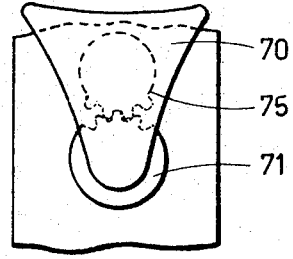
Fig: 21 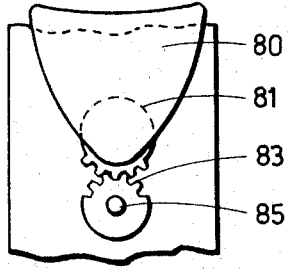
Fig: 16 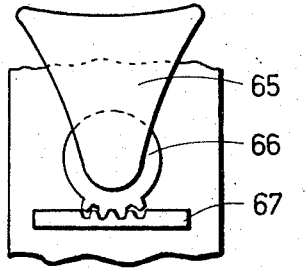
Fig: 18 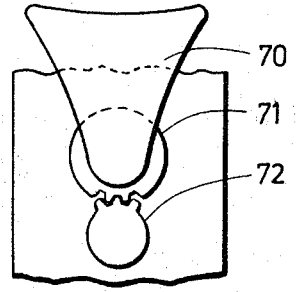
Fig: 20 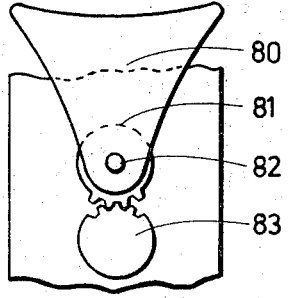
Fig: 22 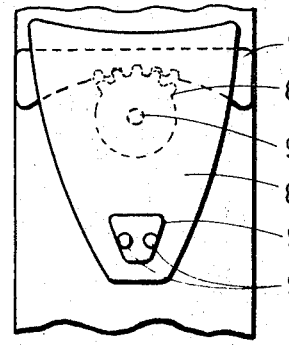
INVENTOR.
Georges P.J. Salomon
BY
Raymond A. Robb
Attorney

United States Patent Office 3,367,671
Patented Feb. 6, 1968

3,367,671
SAFETY BINDING FOR SKIS
Georges P. J. Salomon, 34 Ave. de Loverchy,
Annecy, Haute-Savoie, France
Filed Feb. 9, 1966, Ser. No. 526,188
Claims priority, application France, Feb. 10, 1965,
PV 5,082
12 Claims. (Cl. 280—11.35)

ABSTRACT OF THE DISCLOSURE

The invention and disclosure are directed to a safety securing device for skis wherein there is a boot engaging jaw connected to the ski to allow a lateral rolling displacement of the jaw whereby the jaw may move from a boot engaging position to a boot releasing position. The lateral rolling movement is effected by constantly meshing gears on the ski and the jaw.

---

The present invention relates to a safety securing device for skis.

Most of the known safety securing devices for skis generally have several disadvantages; for instance, the securing devices, the opening of which is obtained by the sliding of lugs or the like along slots having appropriate shapes have a changing sensitivity that hinders their accurate adjustment due to the operation of the device by friction.

Also, the known safety devices articulated on a pivot have a mechanical efficiency greater than those mentioned above but they do not allow an opening sufficient to ensure the release of the boot without jamming of the retaining jaw or jaws against the end of the heel.

In the case of known devices that are articulated on two pivots arranged generally in the longitudinal axis of the ski and reasonably overcoming the advantages of the two types mentioned above, the position of the retaining jaw at the time of opening is uncertain, the latter being generally loose on its articulation.

The present invention proposes to overcome these disadvantages in a simple manner making it further possible to obtain an efficient release of the jaw at the time of the opening.

According to the invention, the safety securing device comprises a jaw having a rearward boot engaging end for holding and stabilizing the forward end of the boot and having a forward end projecting from said rearward end; cooperating toothed means on said jaw forward end and on said ski capable of relative rolling therebetween to allow lateral rolling displacement of said jaw rearward end relative to said ski whereby said jaw may move from boot engaging position to boot releasing position; and locking means to retain said jaw in boot engaging position and releasable upon a twist of said boot of predetermined magnitude.

According to the features of the invention, the jaw opens by moving away from the boot in order to ensure release of the said boot. The jaw is guided in the part thereof opposite that having the inwardly toothed aperture or apertures, toothed wheels, toothed racks or toothed parts in such a manner as to provide a faster opening and a more effective retraction or withdrawal of the said jaw; the jaw and/or the inwardly toothed bores, toothed wheels, toothed racks or portions of racks of the said jaw or of the ski comprise at least one means for locking the jaw in operative position and, eventually, abutments limiting the opening of the jaw in inoperative position.

The invention will besides be best understood by the following description having reference to the appended drawing illustrating, by way of non limitative example, various preferred embodiments of the invention.

Figure 1:
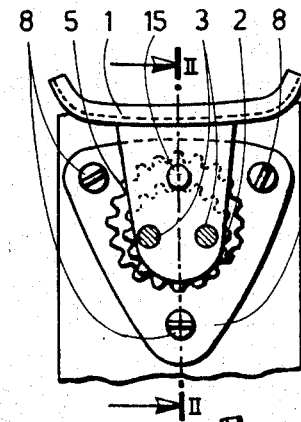
Figure 2:
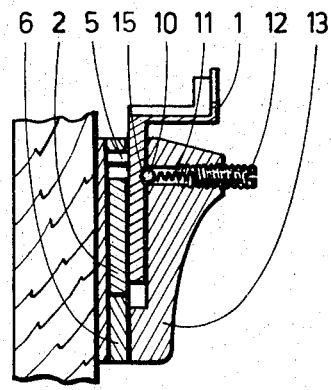
Figure 3:
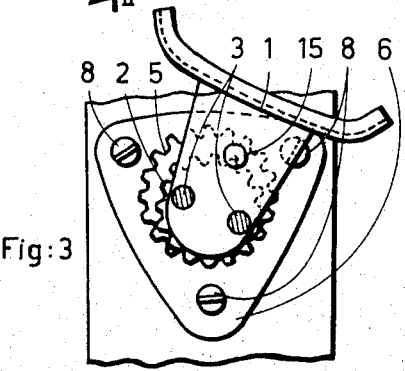
Figure 4:
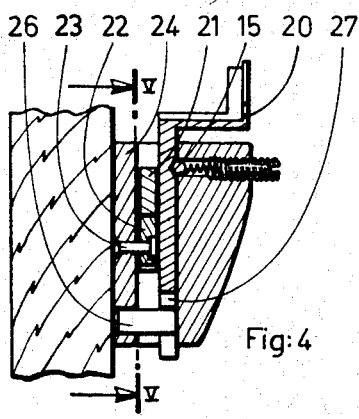
Figure 5:
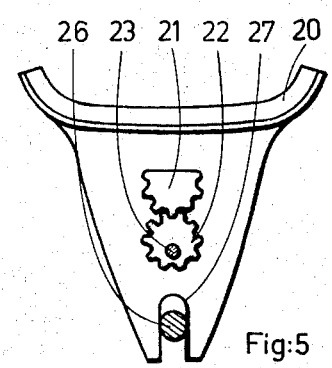

FIG. 1 is a plan view of a securing device according to the invention with the top element removed;
FIG. 2 is a cross-sectional view along line II—II of the securing device of FIG. 1;
FIG. 3 is a plan view of the device of FIG. 1 shown in boot-released position;
FIG. 4 is a longitudinal cross-sectional view of a different embodiment of the invention;
FIG. 5 is a cross-sectional view taken along line V—V of FIG. 4;
FIG. 6 is also a cross-sectional view taken along line V—V of the securing device of FIG. 4 but shown in opened or boot-released position;
FIG. 7 is a longitudinal cross-sectional view of a different embodiment of the invention;
FIG. 8 is a cross-sectional view along line VIII—VIII of FIG. 7;
FIG. 9 is also a cross-sectional view along line V—V of the device of FIG. 7 but shown in opened position;
FIG. 10 is a longitudinal cross-sectional view of a different embodiment of the device of the invention;
FIG. 11 is a cross-sectional view along line XI—XI of the device of FIG. 10;
FIG. 12 is a view similar to that of FIG. 11 shown in opened position; and
FIGS. 13 to 27 are plan views of still other embodiments of the device according to the invention.

In FIGS. 1, 2 and 3, the device comprises a jaw 1 adapted to receive the forward end of the sole of a boot, for instance, and provided inwardly with a toothed wheel 2 secured thereto by means of screws 3. The wheel 2 meshes inside an inwardly toothed bore 5 of a plate 6 secured to the ski by means of screws 8. The jaw 1 is locked into normal holding position of the boot (FIGS. 1 and 2) by any appropriate means such as by means of a ball 10 biased by a spring 11 bearing against an adjusting screw 12 screwed into the body of a thrust block 13 and entering into a ball recess 15 located centrally of the jaw 1. The thrust of the boot on the jaw 1 is supported by the wheel 2 bearing on the bore 5. When the leg of the skier is subjected to a torsion which would be sufficient, for instance, to fracture it, the boot drives the jaw 1 so as to unlock it by retraction of the ball 10 causing the wheel 2 to roll in the inwardly toothed bore 5. The rolling corresponds to a lateral displacement of the jaw causing release of the boot (FIG. 3).

The device of FIGS. 4, 5 and 6 comprises a jaw 20 provided on the forward part thereof with a pinion part 21 secured thereto as by welding, pinion 21 meshing with a second pinion 22 freely swivelling on an eccentric axle 23 fixed to a stationary plate 24, the jaw 20 being besides guided by means of a finger 26 secured to plate 24 and displaceable in a longitudinal slot 27 of the said jaw 20. The jaw also comprises means for locking it in holding position of the boot, for instance, means identical to that of the jaw 1 of FIGS. 1, 2 and 3. Under a strong pressure of the boot corresponding, for instance, to the torsion of the skier's leg, the jaw 20 unlocks and describes a lateral movement by rolling of the pinion 21 on the swivelling pinion 22. Due to the eccentric position of the axle 23, the jaw 20 guided by the pin 26 has moved to the open or inoperative position of FIG. 6 in accordance with the arrow 28, retracting or withdrawing still further upon passing of the end of the boot.

The device of FIGS. 7, 8 and 9 comprises a jaw 30 provided on the forward part with a pinion portion 31 secured thereto and meshing with two pinions 32 and 33 freely swivelling on an eccentric axle respectively 34 and 35 fixed to a plate 38. The device also comprises a means to lock it in holding position of the boot, for instance one that is identical to the securing device of FIGS. 1, 2 and 3. Under a substantial force applied by the boot, the jaw 20 unlocks and opens, driving the two pinions 32 and 33 in rotation according to arrows 41, the jaw 30 moving to open position while retracting or withdrawing to allow free passage of the end of the boot (FIG. 9).

The securing device of FIGS. 10, 11 and 12 comprises a jaw 45 provided, on its forward portion, with a concave toothed sector 46 integral therewith and meshing with a pinion 47 loosely swivelling on an eccentric axle 48 secured to plate 49. The device also comprises means to lock it in holding position of the boot such as the locking means of the jaw of FIGS. 1, 2 and 3 and, on the other hand, the jaw 45 is provided with guiding means constituted by a pin 50 secured to the base 49 and sliding in a longitudinal slot 51 of the said jaw 45. In opened position of the jaw (FIG. 12), caused by an important twist of the boot, the toothed sector 46 rolls on the pinion 47 which, because of the swivelling of the pinion 47 on the eccentric axle 48, causes the displacement of the said jaw 45 according to the arrow 52 freeing the passage of the end of the boot.

In FIG. 13, the device is essentially constituted by a jaw 55 comprising an inwardly toothed bore 56 meshing with a stationary pinion 57 solid with the ski, the meshing being carried out on the portion of the toothed bore 56 opposite that of the jaw 55 on which the boot bears. Any means, not shown, is provided to ensure holding of the said jaw 55 against the boot in holding position of the boot in operative position of the device. Also, guiding means is provided for the jaw 55 during its opening so as to always allow the toothed bore or crown 56 to mesh with pinion 57.

The device of FIG. 14 only distinguishes from that of FIG. 13 in that the meshing of the inwardly toothed bore 56 of the jaw 55 with the stationary pinion 57 takes place on that part of the bore 56 located on the same side as that of the jaw 55 receiving the thrust of the boot, thus ensuring the holding of the saw jaw 55 in operative position of the device and, also, the automatic meshing of the toothed bore or crown 56 on the pinion 57.

The device of FIG. 15 only distinguished from that of FIGS. 1, 2 and 3 in that the meshing of the toothed wheel 2, solid with the jaw 60, similar to jaw 1 of FIGS. 1, 2 and 3, in the stationary inwardly toothed bore 5 takes place on the portion of bore 5 opposite that of the jaw 60 receiving the thrust of the boot. Any means, not shown is provided to ensure holding of the jaw 60 in operative position and the meshing of the toothed wheel 2 in the bore 5 during the opening of the said jaw 60. It will be noted that, in this securing device, the meshing of the toothed wheel 2 in the bore 5 drives the jaw 60 in displacement away from the boot ensuring a better release of the latter.

In FIG. 16, the device comprises a jaw 65 provided with a toothed wheel 66 solid therewith and meshing with a transverse stationary toothed rack 67. The meshing takes place on the portion of the wheel 66 opposite that of the jaw 65 receiving the thrust of the boot.

The device of FIG. 17 only distinguishes from that of FIG. 16 in that the meshing of the toothed wheel 66 on the toothed rack 67 takes place on the portion of the wheel 66 located on the same side as that of the jaw 65 that receives the thrust of the boot. Any means, not shown, ensures the holding of the jaw in operative position of the device against the thrust of the boot and the meshing of the wheel 66 on the toothed rack 67 during opening movement of the said jaw.

In FIG. 18, the device comprises a jaw 70 provided with a toothed wheel 71 solid therewith and meshing with a stationary toothed wheel 72 solid with the ski in such a manner that the meshing takes place on the portion of the wheel 71 opposite that of the jaw 70 on which the boot bears.

The device of FIG. 19 only distinguishes from that of FIG. 18 in that the toothed wheel 71 solid with the jaw 70 meshes with a stationary toothed wheel 75, similar to the wheel 72, secured on the ski in such a manner that the meshing takes place on the part of the wheel 71 located on the side of the jaw 70 receiving the thrust of the boot. Any means, not shown, ensures the holding of the jaw 70 in operative position and meshing of the wheel 71 on the wheel 75 during opening movement of the device.

In FIG. 20, the device comprises a jaw 80 provided with a toothed wheel 81 freely swivelling on an axle 82 solid with the jaw 80, wheel 81 meshing with a stationary toothed wheel 83 solid with the ski in such a manner that the meshing takes place place on the part of wheel 83 corresponding to that of the jaw 80 that receives the thrust of the boot. The jaw 80 comprises a means not shown, for guiding it during its opening, such as that of the jaw 20 of FIGS. 4, 5, and 6 made up of a stationary pin 26 sliding in a slot 27.

The securing device of FIG. 21 only distinguishes from that of FIG. 20 in that the toothed wheel 81 forms a single unit with the jaw 80 and in that the wheel 83 freely swivels on a stationary axle 85 solid with the ski. The jaw 80 also comprises a means for guiding it during its opening such as that illustrated in FIGS. 4, 5 and 6 in relation to jaw 20.

The device of FIG. 22 comprises a jaw 88 provided on its lower end with a toothed wheel 89 freely swivelling on an axle 90 solid with the said jaw 88, meshing with a portion of the toothed crown 91 in such a manner that the meshing takes place on a portion of the crown 91 opposite that of the jaw 88 that receives the thrust of the boot. The jaw 88 is guided, during its opening movements, by means of two stationary lugs 92 and a slot or aperture through the jaw 88 of appropriate shape.

Figure 23:
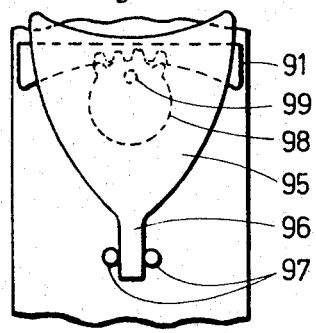

The securing device of FIG. 23 only distinguishes from that of FIG. 22 in that the means for guiding the jaw 95 which is similar to the means 88 of FIG. 22 is constituted by an appropriate arm 96 of the jaw 95 movable between two stationary lugs 97 solid with the ski, and in that the toothed wheel 98 swivels on an eccentric axle 95 solid with the said ski.

Figure 24:
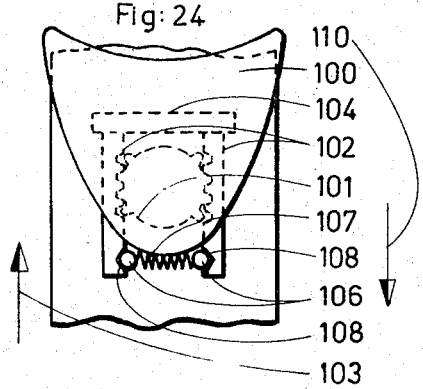

In FIG. 24, the device comprises a jaw 100 provided in the forward part with a toothed wheel 101, solid therewith, meshing with two toothed racks 102 longitudinally slidable on each side of the said wheel 101. In closed position of the jaw, along arrow 103 for instance, the two toothed racks 102 abut against a stationary transverse bar 104. On the other hand, the two toothed racks 102 comprises a means for locking in relative sliding movement constituted, for instance, by two balls 106 biased by a compression spring 107 in an appropriate notch 108 in each toothed rack 102. During an appreciable torsion exerted by the boot, the jaw 100 unlocks by withdrawal or retraction of the balls 106 and makes an opening movement corresponding to the meshing of its wheel 101 on one of the two toothed racks 102 abutting against the bar 104, the other toothed rack 102 then sliding along arrow 110 in moving away from the said transverse bar 104.

Figure 25:
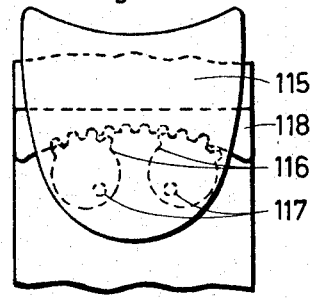

In FIG. 25, the device comprises a jaw 115 provided on its lower portion with two toothed wheels 116 freely swivelling on two eccentric axles 117 solid with the said jaw 115, wheels 115 meshing with a toothed crown portion 118 solid with the ski in such a manner that the meshing is carried out on the inner part of the crown 118 opposite that of the jaw 115 that receives the thrust of the boot.

Figure 26:
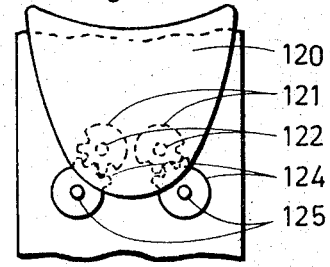

In FIG. 26, the device comprises a jaw 120 provided on the lower end with two toothed wheels 121 freely swivelling on two central axles 122 solid with the said jaw 120, wheels 121 each meshing with one of the two wheels 124 freely swivelling on two central axles 125 solid with the ski, symmetrically arranged in relation to the longitudinal axis of the ski.

Figure 27:
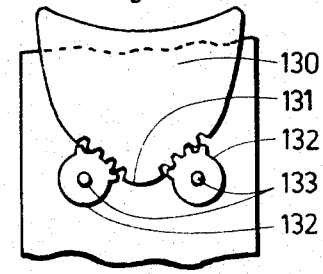

In FIG. 27, the device comprises a jaw 130 the end 131 of which is toothed for meshing engagement with two pinions 132 freely swivelling on two central stationary axles 133 solid with the ski. The end 131 of the jaw 130 is shaped according to a profile that allows an opening movement of the said jaw 130 ensuring the release of the end of the boot.

It is obvious that the jaw described in reference to the various figures of drawing could be replaced by any other member capable of holding and/or stabilising the boot. For instance, it could have the shape of a stirrup. Also, it could be provided with catches, preferably vertical, making it easier to drive it in open position by the boot and its lateral wings holding the boot could be stationary, movable, adjustable, etc.

Although the invention has been described with reference to specific embodiments of the invention, it will be understood that various modifications could be made thereto without departing from the spirit of the invention, the scope of which is set forth in the appended claims.

I claim:
1. In a safety securing device for ski, the combination comprising:
   (a) a jaw having a rearward boot engaging end for hold- and stabilizing the forward end of the boot and having a forward end projecting from said rearward end;
   (b) cooperating gear means having gear parts on said jaw forward end and on said ski in meshing engagement for relative rolling therebetween to allow lateral rolling displacement of said jaw rearward ned relative to said ski whereby said jaw may move from boot engaging position to boot releasing position;
   (c) locking means to retain said jaw in boot engaging position and releasable upon a twist of said boot of predetermined magnitude, and
   (d) means to constantly retain said gear means in meshing engagement.

2. A combination as claimed in claim 1, including cooperating guiding means on said jaw forward end and ski for guiding the rolling motion of said jaw.

3. A combination as claimed in claim 1, wherein said gear comprises:
   a base plate secured to said ski and having a toothed bore;
   a pinion beneath and fixed to said jaw forward portion in meshing engagement with said toothed bore for relative rolling motion, and
   Wherein said retaining means is a thrust block over said jaw and fixed to said base plate to retain said pinion within said toothed bore.

4. A combination as claimed in claim 3 wherein said jaw forward end is provided with a central ball recess and said locking means comprises:
   a ball movable into and out of said recess;
   adjustable resilient means biasing said ball against said jaw forward end and into said recess when said jaw is in boot engaging position;
   said block having a through aperture for the mounting of said ball and adjustable resilient means.

5. A combination as claimed in claim 1, wherein said gear means comprises:
   a base plate secured to said ski;
   a toothed rack on said plate transversely of said ski;
   a pinion beneath and fixed to said jaw forward portion in meshing engagement with said toothed rack for rolling motion on said rack, and
   wherein said retaining means is a thrust block over said jaw and secured to said base plate to retain said jaw forward end and pinion against said base plate.

6. A combination as claimed in claim 1 wherein said gear means comprises;
   a base plate secure to said ski;
   a first pinion fixed to said jaw forward end;
   a pair of freely rotatable eccentric second pinions mounted on said base in engagement with said first pinion for relative rolling motion, and
   wherein said retaining means is a thrust block over said jaw forward end and fixed to said base plate to retain said jaw forward end against said base plate.

7. A combination as claimed in claim 1 wherein said gear means comprises:
   a base plate secured to said ski;
   a stationary pinion fixed to said base plate;
   said jaw forward end having a toothed bore for engagement with said toothed pinion, and
   wherein said retaining means is a thrust block over said said jaw forward end and fixed to said base plate to retain said pinion within said toothed bore.

8. A combination as claimed in claim 2 wherein said gear means comprises:
   a base plate secured to said ski;
   an arcuate toothed member fixed to said jaw forward end;
   a pinion eccentrically mounted for rotation on said base plate, in meshing engagement with said arcuate toothed member, and
   wherein said retaining means is a thrust block over said jaw forward end and fixed to said base plate to retain said jaw forward end against said base plate.

9. A combination as claimed in claim 8 wherein said arcuate toothed member in a pinion.

10. A combination as claimed in claim 2, wherein said gear means comprises:
    a base plate secured to said ski;
    an arcuate toothed member mounted on said base plate;
    a pinion mounted on said jaw forward part and meshing with said toothed member, and
    wherein said retaining means is a thrust block over said jaw forward end and fixed to said base plate to retain said jaw forward end against said base plate.

11. A combination as claimed in claim 10 wherein said arcuate toothed member is a pinion mounted for rotation on said base plate.

12. A combination as claimed in claim 10 wherein said pinion is mounted for rotation on said jaw forward end.

References Cited

UNITED STATES PATENTS 3,288,476  11/1966  Ramillon _____ 280—11.35

FOREIGN PATENTS 1,359,294  3/1964  France.

LEO FRIAGLIA, *Primary Examiner.*

BENJAMIN HERSH, *Examiner.*

J. H. BRANNEN, *Assistant Examiner.*